(12) United States Patent
Wang

(10) Patent No.: US 10,074,861 B2
(45) Date of Patent: Sep. 11, 2018

(54) SELF-HEATING FUEL CELL SYSTEMS

(71) Applicant: EC Power, LLC, State College, PA (US)

(72) Inventor: Chao-Yang Wang, State College, PA (US)

(73) Assignee: EC Power, LLC, State College, PA (US)

(*) Notice: Subject to any disclaimer, the term of this patent is extended or adjusted under 35 U.S.C. 154(b) by 157 days.

(21) Appl. No.: 15/003,348

(22) Filed: Jan. 21, 2016

(65) Prior Publication Data

US 2016/0211535 A1 Jul. 21, 2016

Related U.S. Application Data

(60) Provisional application No. 62/105,875, filed on Jan. 21, 2015.

(51) Int. Cl.
*H01M 8/04007* (2016.01)
*H01M 8/1018* (2016.01)
(Continued)

(52) U.S. Cl.
CPC ... *H01M 8/04037* (2013.01); *H01M 8/04225* (2016.02); *H01M 8/04268* (2013.01); *H01M 8/04365* (2013.01); *H01M 2008/1095* (2013.01); *H01M 2250/10* (2013.01); *H01M 2250/20* (2013.01); *Y02B 90/14* (2013.01); *Y02T 90/32* (2013.01)

(58) Field of Classification Search
None
See application file for complete search history.

(56) References Cited

U.S. PATENT DOCUMENTS 6,358,638 B1  3/2002  Rock et al.
8,263,278 B2  9/2012  Imanishi et al.
(Continued)

FOREIGN PATENT DOCUMENTS

JP  2009-118729 A  5/2009
JP  2010-205710 A  9/2010
(Continued)

OTHER PUBLICATIONS

Written Opinion issued in corresponding International Application No. PCT/US2016/014310, dated Jun. 22, 2016.
(Continued)

*Primary Examiner* — Muhammad S Siddiquee
(74) *Attorney, Agent, or Firm* — McDermott Will & Emery LLP

(57) ABSTRACT

Fuel cell systems, e.g. systems including proton exchange membrane (PEM) fuel cells, are engineered to have more than one internal electrical resistance that can change according to temperature. Such changes in internal electrical resistance levels allow rapid heat-up of the fuel cells from low temperatures to an elevated temperature that is optimal for water management and fuel cell operation. The fuel cell systems can include at least one fuel cell and at least one resistor-switch unit electrically connected to the at least one fuel cell. The at least one resistor-switch unit includes a resistor and a switch in which the switch is electrically connected in parallel with the resistor.

20 Claims, 10 Drawing Sheets

(51) Int. Cl.
*H01M 8/04223* (2016.01)
*H01M 8/04225* (2016.01)
*H01M 8/0432* (2016.01)

(56) References Cited

U.S. PATENT DOCUMENTS

| | | | |
|---|---|---|---|
| 2003/0190508 A1* | 10/2003 | Takeyama | B01J 19/0093 422/198 |
| 2005/0058865 A1 | 3/2005 | Thompson et al. | |
| 2006/0199053 A1 | 9/2006 | An et al. | |
| 2007/0154749 A1* | 7/2007 | Kato | H01M 8/0269 429/432 |
| 2008/0252257 A1 | 10/2008 | Sufrin-Disler et al. | |
| 2009/0136803 A1* | 5/2009 | Yamamoto | H01M 8/04007 429/412 |
| 2011/0181424 A1 | 7/2011 | Hu et al. | |
| 2011/0236089 A1* | 9/2011 | Tanaka | G03G 15/2053 399/329 |
| 2014/0342194 A1 | 11/2014 | Wang et al. | |
| 2015/0104681 A1 | 4/2015 | Wang et al. | |
| 2015/0303444 A1 | 10/2015 | Wang et al. | |

FOREIGN PATENT DOCUMENTS

| | | |
|---|---|---|
| WO | 2014/186195 A1 | 11/2014 |
| WO | 2015/102708 A2 | 7/2015 |
| WO | 2015/102709 A2 | 7/2015 |
| WO | 2016/018738 A1 | 2/2016 |

OTHER PUBLICATIONS

The entire file history of co-pending U.S. Appl. No. 14/447,005.
K. Tajiri et al., "Cold start of polymer electrolyte fuel cells", Modern Aspects of Electrochemistry, vol. 49, p. 89-128, Springer, 2010.
International Search Report issued in Application No. PCT/US2016/014310 dated Jun. 22, 2016.
Entire file history of co-pending U.S. Appl. No. 14/255,780.
Entire file history of co-pending U.S. Appl. No. 14/189,517.
Entire file history of co-pending U.S. Appl. No. 14/267,648.
Extended European Search Report issued in Application No. 16740752.7 dated Jun. 27, 2018.

* cited by examiner

Multi-step changes in resistance at various threshold temperatures

Sharp change in resistance around a threshold temperature $T_1$

Step-change in resistance at a threshold temperature $T_1$

SELF-HEATING FUEL CELL SYSTEMS

CROSS-REFERENCE TO RELATED APPLICATION

This application claims the benefit of U.S. Provisional Application No. 62/105,875 filed Jan. 21, 2015 the entire disclosure of which is hereby incorporated by reference herein.

TECHNICAL FIELD

The present disclosure relates generally to fuel cell systems including one or more fuel cells, e.g. proton exchange membrane fuel cells, engineered to have more than one internal electrical resistance levels. The internal electrical resistance level is engineered to change substantially with temperature. Such changes to electrical resistance levels allow rapid heat-up of the fuel cell system from low temperatures to an elevated temperature that is optimal for water management and fuel cell operation. Such fuel cell systems include hydrogen fuel cells for vehicle and stationary applications.

BACKGROUND

Currently, fuel cells such as proton exchange membrane (PEM) fuel cells have significant difficulties when starting in cold environments, particularly at or below subzero temperatures. It is widely believed that during PEM fuel cell operation at subzero temperatures water produced from the oxygen reduction reaction (ORR) forms ice in the cathode catalyst layer (CL) that hinders the oxygen transport to the reaction sites, which can cause the PEM fuel cell to eventually shut down. Several technologies attempt to address operating fuel cells in cold environments.

For example, U.S. Pat. No. 6,358,638 B1 discloses an in-situ chemical heating method to produce heat during cold start and hence warm-up a fuel cell stack towards the freezing point. In this method, either a small amount of $O_2$ is injected into the anode to induce $O_2$—$H_2$ combustion in the anode catalyst layer, thereby producing heat. Or a small amount of $H_2$ is injected into the cathode to induce $H_2$—$O_2$ combustion in the cathode catalyst layer for heat production. In both cases, the method is not effective as it also produces water which turns into ice and fills up the catalyst layer so that the fuel cell becomes inoperable. The amount of heat produced by this method is limited by the water storage capacity of the catalyst layer and is rather small due to the small void space in a thin catalyst layer. Additionally, this method incurs degradation of the catalyst layer as the $H_2$—$O_2$ catalytic reaction in the anode catalyst layer will promote carbon corrosion in the cathode catalyst layer, and $H_2$—$O_2$ catalytic reaction in the cathode catalyst layer may result in hot spot formation over the membrane.

U.S. Pat. No. 8,263,278 B2 discloses an oxygen starvation technique to maintain a low cell voltage and hence low-efficiency operation such that there is more internal heat generated to warm up a fuel cell stack. This method of oxygen starvation leads to hydrogen pumping from the anode to cathode compartment, thereby requiring dilution of the cathode exhaust in order to keep the hydrogen concentration below a flammability limit before emitting into the ambient. The oxygen starvation method also requires elaborative control steps and may cause degradation of fuel cell materials.

Therefore, it is desirable to develop a simple, non-degrading method to rapidly start-up a fuel cell from subzero temperatures.

Further, water management in fuel cells operating from low ambient temperatures, e.g. room temperature, before reaching an optimal range, e.g. 60-80° C., has been exceedingly difficult. Bulky humidification systems along with sophisticated controls are employed in order to properly manage water and prevent electrode, gas-diffusion layer and flow channel from flooding by liquid water. A simple approach to this water management problem at low temperatures could be a thermal method in which a cell is quickly heated up from room-temperature to the design point of elevated temperature. The higher cell temperature dramatically promotes water evaporation and removal through vapor phase diffusion, thereby alleviating flooding of fuel cell components and materials.

SUMMARY OF THE DISCLOSURE

Advantages of the present disclosure include the design and operation of fuel cell systems. The fuel cell systems of the present disclosure are advantageously engineered to operate at different internal electrical resistance levels based on a temperature of one or more fuel cell in the system.

These and other advantages are satisfied, at least in part, by a self-heating fuel cell system. The system comprises at least one fuel cell and at least one resistor-switch unit which includes a resistor and a switch wherein the switch is electrically connected in parallel with the resistor. The switch can direct current through the resistor (High Resistance State) or can direct current to bypass the resistor (Low Resistance State). The resistor is preferably placed in direct contact with the fuel cell so that heat generated from the resistor can heat the fuel cell.

Embodiments of the present disclosure include any one or more combinations of the following features. For example, the system can include a stack of fuel cells wherein the at least one fuel cell is among the stack of fuel cells. In addition, the one or more fuel cells can individually include an anode catalyst electrode, a cathode catalyst electrode and proton exchange membrane therebetween. In some embodiments, the one or more fuel cells can include an anode catalyst layer and/or a cathode catalyst layer having ultrathin thicknesses, e.g., a thicknesses equal to or less than 1 micrometer. In various embodiments, the one or more fuel cells can further comprise a bipolar plate with a flowfield for fuel flow on an anode, diffusion media on a membrane-electrode assembly, a bipolar plate with a flowfield for oxidant flow on a cathode, wherein the resistor is placed in direct contact with one of the bipolar plates. In some embodiments the resistor is inside a fuel cell, or outside of a fuel cell or when the system includes a stack of fuel cells, the resistor-switch unit can be interposed between two cells in the stack. In other embodiments, the resistor can be a thin metal sheet having one or more electrically insulating films on one or both major surfaces of the sheet and/or the sheet can have tabs at either end of the resistor. In still further embodiments, the system can include a controller for operating the switch. In various embodiments, the controller can be further configured to receive an input from a temperature sensing device on the fuel cell. In some embodiments, the controller is configured to operate the switch to an open state or a closed state based upon an input from a temperature sensing device that can measure a surface temperature of the at least one fuel cell.

Another aspect of the present disclosure includes a self-heating fuel cell system having a first internal resistance ($R_1$) of the system when the temperature of the at least one fuel cell is greater than a temperature ($T_1$) and a second internal resistance ($R_2$) of the system when the temperature of the at least one fuel cell is below $T_1$, wherein the value of $R_2$ at about 2° C. below $T_1$ is at least twice the value of $R_1$ at $T_1$. Such a self-heating fuel cell system can include any one or more features described above and referenced herein.

Further embodiments include any one or more combinations of the following features. For example, wherein $T_1$ is no greater than 0° C., e.g., between −5° C. and 0° C. In other embodiments $T_1$ is less than 95° C., e.g., between 45 and 95° C., and preferably between 60 to 80° C.

Another aspect of the present disclosure includes a method of operating a self-heating fuel cell system. The method comprises operating the system at a first internal resistance ($R_1$) when the temperature of at least one fuel cell in the system is greater than a temperature ($T_1$), and operating the system at a second internal resistance ($R_2$) of the system when the temperature of the at least one fuel cell is below $T_1$, by activating a switch that activates either $R_1$ or $R_2$ depending on $T_1$. The self-heating fuel cell system can include any one or more of the features described above or herein.

Additional advantages of the present disclosure will become readily apparent to those skilled in this art from the following detailed description, wherein only the preferred embodiment of the disclosure is shown and described, simply by way of illustration of the best mode contemplated of carrying out the disclosure. As will be realized, the disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 1A shows a step jump at a threshold temperature $T_1$; FIG. 1B shows a sharp but smooth jump around a threshold temperature $T_1$; and FIG. 1C shows multi-step changes at multiple threshold temperatures. The characteristic curves of a self-heating fuel cell system of the present disclosure (drawn solid lines) are contrasted to that of a conventional fuel cell (drawn in dashed lines).

DETAILED DESCRIPTION OF THE DISCLOSURE

Figure 1C:
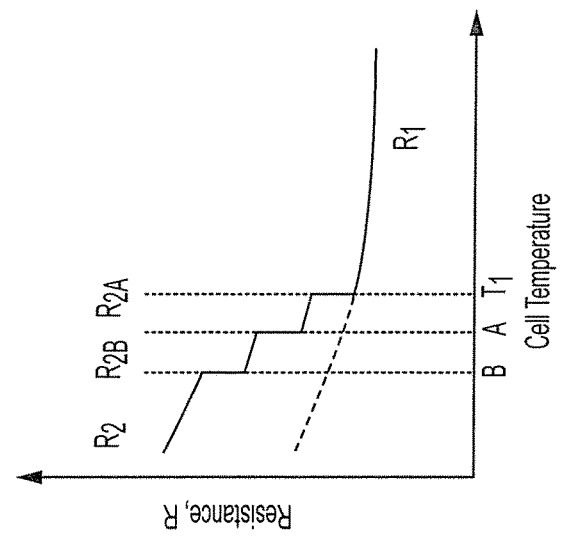
FIGS. 1A-1C schematically show characteristics of an idealized self-heating fuel cell system where the resistance of a fuel cell in the system changes according to temperature.

The present disclosure relates a self-heating fuel cell system. Such a system can include at least one fuel cell and at least one resistor-switch unit (RSU). The resistor-switch unit includes a resistor and a switch wherein the switch is electrically connected in parallel with the resistor. The switch can direct current through the resistor (High Resistance State) or can direct current to bypass the resistor (Low Resistance State). Electrical current through the resistor generates heat. Preferably, the resistor is placed in direct contact with the fuel cell so that heat generated from the resistor can heat the fuel cell.

Advantageously, the change in internal resistance occurs at a threshold temperature $T_1$ which can be set according to the particular fuel cell system but it typically less than 95° C. However, $T_1$ can also be set to 0° C. or less, e.g., between −5° C. and 0° C., so that the fuel cell can self-heat rapidly from subzero temperatures. By this mechanism, a fuel cell operation starting from room temperature or below will exhibit a very high internal resistance level, which generates immense heat and rapidly heats up the fuel cell to an optimal operation range, e.g., around 60° C. to 80° C. Such a structure can also facilitate water management in a PEM fuel cell, for example.

In an aspect of the present disclosure, the fuel cell system is configured to include a first internal resistance ($R_1$) of the system when the temperature of at least one fuel cell in the fuel cell system is greater than a temperature ($T_1$) and a second internal resistance ($R_2$) of the system when the temperature of the of the at least one fuel cell is below $T_1$. Preferably the value of $R_2$ changes abruptly, such as in a step function, or changes sharply, such as in a continuous but rapid change in resistance, around $T_1$. For example, the value of $R_2$ at about 2° C. below $T_1$ is at least twice the value of $R_1$ at $T_1$. Advantageously, the value of $R_2$ at about 2° C. below $T_1$ is at least twice to fifty times the value of $R_1$ at $T_1$. The change in internal resistance of the fuel cell system is advantageously reversible, i.e., the internal resistance can switch between $R_2$ and $R_1$ around $T_1$.

Advantageously, both the need for cold start and water management of a fuel cell can be addressed by a self-heating fuel cell system according to the present disclosure. For example, when the cell temperature drops below a threshold value, e.g., below about 0° C., the cell's internal ohmic resistance can be increased substantially so that the cell voltage and energy efficiency become low, which in turn increases the internal heat generation substantially. Furthermore, the ratio of heat to water production can be significantly improved, which promotes rapid heat-up of the fuel cell system from a subfreezing temperature while significantly minimizing the possibility of fuel cell shutdown by the product water that can turn into ice in a catalyst layer. As used herein subfreezing and subzero mean a temperature less than 0° C.

The fuel cell system of the present disclosure can be implemented in a variety of fuel cell configurations. For example, the fuel cell system of the present disclosure can be implemented in direct systems where fuel, such as hydrogen, methanol, hydrazine, etc., can react directly in the fuel cell and indirect systems in which fuel, such as natural gas or other fossil fuels, is first converted by reforming to a hydrogen rich gas which is then fed into the fuel cell. Such systems can be used to power vehicles or stationary facilities, for example.

In some embodiments, the fuel cell system includes a proton exchange membrane fuel cell that can operate on hydrogen or hydrogen-containing gases. In other embodiments, the fuel cell system is an alkaline membrane fuel cell, an intermediate-temperature fuel cell operating between 100 and 300° C., such as polybenzimidazole (PBI) fuel cells, or a solid oxide fuel cell. All of these various fuel cell system configurations can be used in the present disclosure.

In one aspect of the present disclosure, the fuel cell system includes at least one fuel cell and at least one resistor-switch unit. The resistor-switch unit is electrically connected to the at least one fuel cell. Electrical current generated by the fuel cell during operation of the system flows through the resistor-switch unit and directly or indirectly to another fuel cell or to an external load.

The major components of a fuel cell can include, for example, an anode, cathode and electrolyte therebetween. In certain configurations, the anode electrode includes an anodic catalyst layer and a gas diffusion layer and the cathode electrode includes a cathodic catalyst layer and a gas diffusion layer. The anode and cathode can be sandwiched by bipolar plates having channels to supply fuel to the anode and an oxidant to the cathode. Certain fuel cells include a membrane-electrode assembly (MEA), such as proton exchange membrane fuel cells, and with bipolar plates and interconnects and sometimes gaskets for sealing/preventing leakage of gases between the anode and cathode. Since the voltages generated during the discharge of a single fuel cell tends to be low, multiple fuel cells are preferably electrically connected together to obtain higher voltages. Such systems are commonly referred to as a fuel cell stack.

The resistor-switch unit of the self-heating fuel cell system of the present disclosure includes a resistor and a switch, wherein the switch is electrically connected in parallel with the resistor. When the self-heating fuel cell system includes a fuel cell stack, multiple resistor-switch units can be inserted between fuel cells over several locations in the fuel cell stack. The multiple resistor-switch units are electrically connected to the fuel cells in the stack. In such systems, the multiple switches can be activated sequentially according to a control algorithm.

Resistors that are useful for the present disclosure can be made of, for example, graphite, highly ordered pyrolytic graphite (HOPG), stainless steel, nickel, chrome, nichrome, copper, aluminum, titanium, or combinations thereof. In certain embodiments, the resistor of the present disclosure is preferably flat with a large surface area so that it can have good thermal contact with one or more fuel cells. In other embodiments, the resistor can be a thin metal sheet having one or more electrically insulating films on one or both major surfaces of the sheet. Such a sheet can have tabs at either end of the resistor, which can be used to electrically connect the resistor to one or more fuel cells and to the switch. The resistor can have an overall thickness between 1 and 100 micrometers.

In addition, the resistance of a resistor of the present disclosure can be adjusted by forming a pattern within the resistor such as forming a pattern within a resistor in the form of a sheet, i.e., removing material from the resistor sheet. Patterning allows a resistor to have a sufficient thickness for mechanical strength and weldability but a large resistance. Such patterns include a serpentine pattern, for example.

Electrically insulating films that can be used with the resistors of the present disclosure include, for example, polyethylene, polypropylene, chlorinated polypropylene, polyester, polyimide, PVDF, PTFE, nylon, or co-polymers thereof. The electrically insulating films can have a thickness between 0.1 and 50 micrometers.

The switch of the present disclosure can include those activated by thermally sensitive devices such as a phase-change material that undergoes phase transition and appreciable volume change at $T_1$, or a bimetal switch, or a solid material whose volume expands appreciably at temperature $T_1$, for example. In addition, the switch of the present disclosure can be composed of an electromechanical relay and a temperature controller, or a solid-state relay with a temperature sensor, a power MOSFET with a temperature sensor, or a high-current switch with a temperature sensor.

In certain embodiments, the self-heating fuel cell system can include a controller configured to operate the switch. The controller can be further configured to receive an input from a temperature sensing device, e.g., a thermocouple or a thermistor, that can measure a surface temperature of the fuel cell. In some embodiments, the controller can be configured to operate the switch to an open state or a closed state based upon an input from the temperature sensing device.

An advantage of the present disclosure is a fuel cell system, such as a PEM fuel cell, whose internal resistance can change according to cell temperature. When the cell temperature lies below a threshold value, e.g. the freezing point, the cell's ohmic resistance increases sharply such that the cell voltage and efficiency become low, which increases the internal heat generation substantially. Specifically, the heat generation rate of a fuel cell can be related to the water production rate in a fuel cell as follows:

$$q(J/cm^2) = \frac{2F(E_h - V_{cell})}{M_{H_2O}} \Delta m_{H_2O}(mg/cm^2)$$

where F is the Faraday constant, $M_{H_2O}$ is the molecular weight, $E_h$ is the thermodynamic cell potential (=$\Delta h/$ 2F~1.48 V for $H_2$—$O_2$ reaction) and $V_{cell}$ is the cell output voltage. See also Tajiri and Wang, Modeling and Diagnostics of Polymer Electrolyte Fuel Cells, Vol 49, Chapter 3, Cold Start of Polymer Electrolyte Fuel Cells, Springer Science, 2010. It is clearly seen that the ratio of heat generation to water production is significantly higher with lower output voltage, thereby promoting rapid warm-up of a fuel cell from a subfreezing temperature while minimizing the possibility of clogging and shutting down the fuel cell due to formation of water/ice in the system.

Figure 1B:
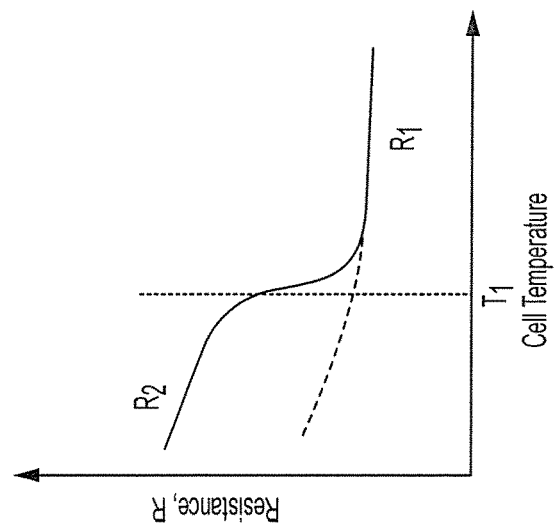
Figure 1A:
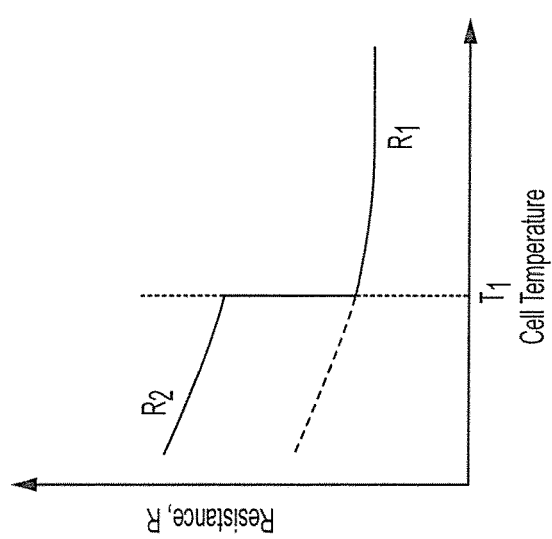
Figure 2A:
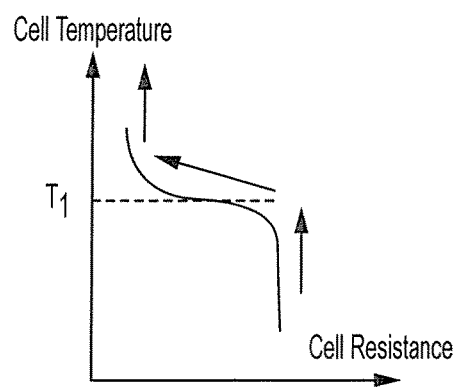
FIGS. 2A-2D are a schematic illustration of a step-by-step mechanism of how a self-heating fuel cell system according to an embodiment of the present disclosure can promote internal heating of a fuel cell from a subzero temperature. As shown in the figures: a high internal resistance leads to low output voltage and high internal heat generation which promotes a rapid rise in cell temperature.
Figure 2D:
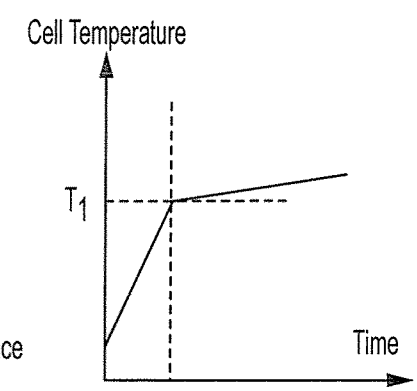
Figure 2B:
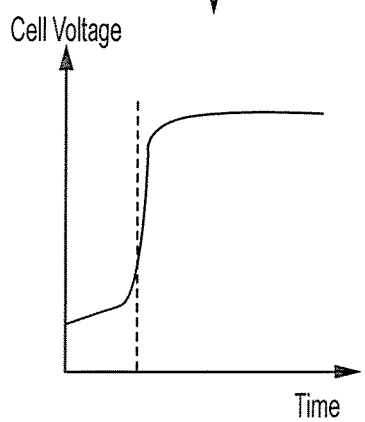
Figure 2C:
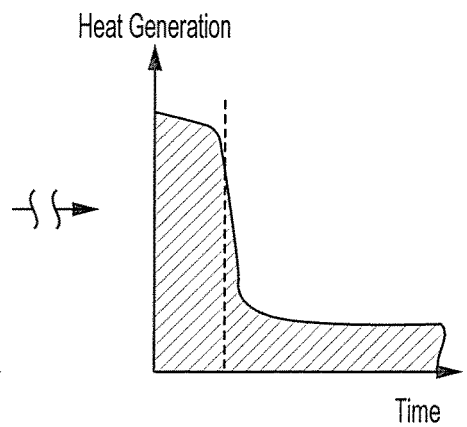

An aspect of a self-heating fuel cell system of the present disclosure is that the internal resistance of the system can change abruptly when a fuel cell in the system reaches a threshold temperature $T_1$. Such changes in the internal resistance of a self-heating fuel cell system are depicted in the idealized resistance-to-temperature relationship in FIGS. 1A-1C, where a fuel cell system of the present disclosure (solid lines) is contrasted to that of a conventional fuel cell system (dashed lines). For example and as shown in FIG. 1A, the internal resistance of a fuel cell system of the present disclosure at a threshold value $T_1$, say between −5° C. and 0° C., can change as a step function according to temperature. FIG. 1B illustrates a smooth, but sharp change in the cell internal resistance around the threshold temperature, say between −5° C. and 0° C. FIG. 1C shows a multi-step change in the ohmic resistance of the system at multiple threshold temperatures below $T_1$, e.g., the internal electrical resistance of the system below $T_1$ ($T_{1a}$ and $T_{1b}$) has multiple sub-levels ($R_{2a}$ and $R_{2b}$).

The mechanism by which a self-heating fuel cell system can improve and accelerate startup of the system from a subfreezing temperature is illustrated in FIGS. 2A-2D. For example, starting an ambient temperature below the threshold value $T_1$, the fuel cell system can be operated in a high resistance state FIG. 2A, resulting in low output voltage FIG. 2B and high internal heat generation FIG. C. The latter leads to rapid rise in fuel cell temperature FIG. 2D. Once the fuel cell temperature exceeds $T_1$, the system can be operated in a low resistance state reducing the internal resistance of the system to as low as in a conventional fuel cell system, making the electrical output voltage and energy conversion efficiency as high as in a conventional fuel cell.

Figure 3:
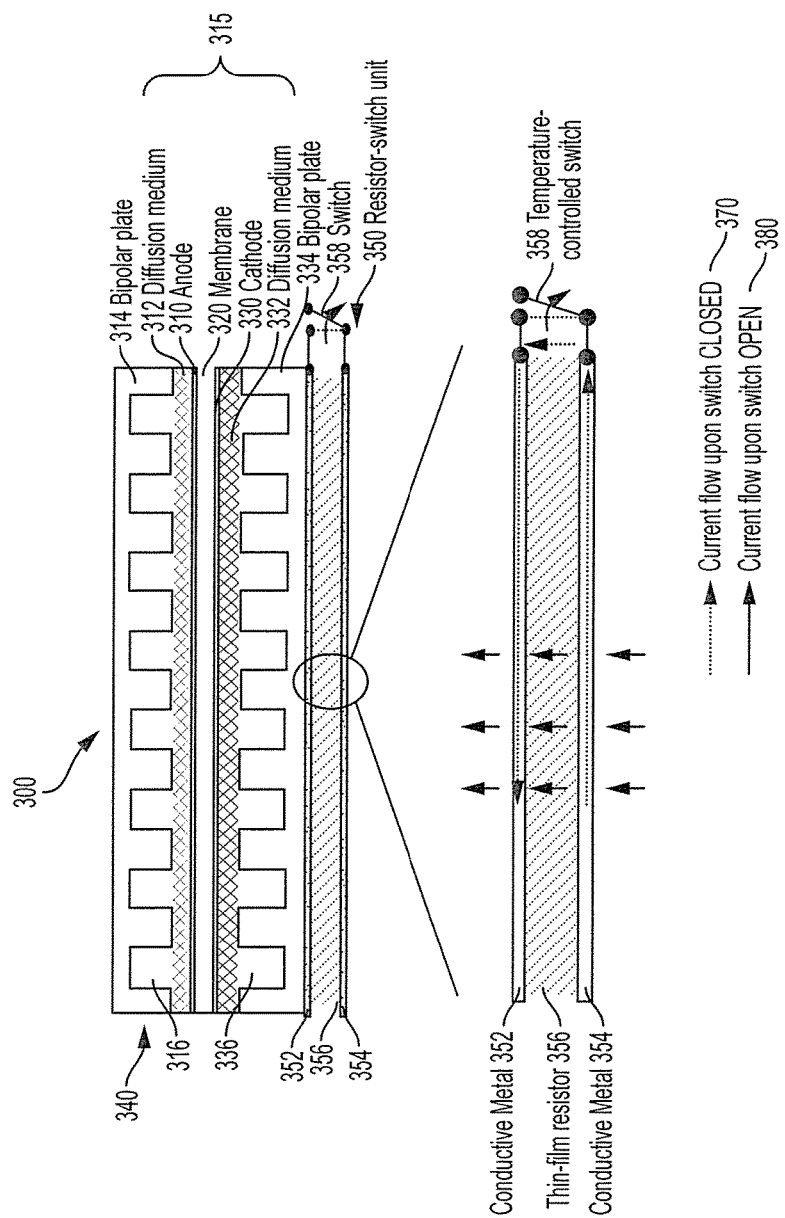
FIG. 3 is a schematic illustration of single fuel cell having a resistor-switch unit (RSU) attached to a bipolar plate of the fuel cell, according to an embodiment of the present disclosure.

FIG. 3 illustrates an embodiment of a self-heating fuel cell system of the present disclosure. As shown in the figure, fuel cell system 300 includes fuel cell 340. In this embodiment, fuel cell 340 is a membrane electrode assembly (MEA) with diffusion media (315). The MEA with diffusion media includes anode catalyst layer 310 on diffusion medium 312, proton exchange membrane 320, and cathode catalyst layer 330 on diffusion medium 332. A typical example of a proton exchange membrane is one composed of a perfluorosulfonic acid-tetrafluorethylene copolymer. The MEA is sandwiched between two bipolar plates (314, 334) having channels to supply fuel to the anode and an oxidant to the cathode (316 and 336, respectively). In this embodiment, bipolar plate 314 in which gaseous fuel can flow (called the anode side), an anode diffusion medium 312, a membrane electrode assembly, and a cathode diffusion medium are connected to another bipolar plate 334 in which an oxidant, e.g., air, can flow (called the cathode side). A resistor-switch unit (RSU) can be attached to either bipolar plate. In this embodiment, RSU 350 is electrically connected to the fuel cell 340 through bipolar plate 334 and in direct contact with bipolar plate 334.

As shown in the figure, RSU 350 includes upper sheet of conductive metal 352 electrically connected and in direct contact with bipolar plate 334, lower sheet of conductive metal 354, thin-film resistor 356 interposed between upper sheet 352 and lower sheet 354 and thermal switch 358 that can electrically connect upper sheet 352 with lower sheet 354.

Current flowing through RSU is depicted in the blow-up section of the figure. For example, when switch 358 is closed (Low Resistance State), such as whenever the fuel cell temperature is above a threshold value ($T_1$), current predominately, if not entirely, flows from the fuel cell through the sheets of conductive metal (352 and 354) (shown as dotted lines (370)) effectively bypassing thin film resistor 356 and thereby not adding extra internal electrical resistance to the cell. However, when the cell temperature drops below the threshold value $T_1$, the switch is opened (High Resistance State) which forces current generated from the fuel cell to flow through the thin-film resistor (shown by solid lines (380)) and thereby increasing the total cell resistance of the system by $\Delta R$ and lowering the output voltage to a lower level, e.g., the system output voltage can be lowered to about 0.1V per cell. Joule heat generated on the resistor in turn accelerates warm-up of the fuel cell to above $T_1$. Once the cell temperature rises above $T_1$, the switch can be operated in the closed state (Low Resistance State), and the internal resistance recovers to a low value characteristic of a conventional fuel cell without the RSU and the terminal voltage jumps to a normal operation level under a certain current.

Although FIG. 3 illustrates one fuel cell and one RSU, the fuel cell system of the present disclosure can have multiple fuel cells such as a fuel cell stack and multiple RSU inserted between fuel cells over several locations in the fuel cell stack.

Another embodiment of the present disclosure includes fabricating a fuel cell system having at least one fuel cell and RSU. Such a system can be made by a layer-by-layer deposition. For example, a bipolar plate can be first used as a substrate to deposit an electrically insulating layer, such as a poly(xylylene) polymer (e.g., parylene), followed by depositing a conducting layer (e.g., a metal) to form a serpentine-patterned resistor layer. The conductive layer can be covered by another electrically insulating layer, such as a poly(xylylene) polymer (e.g., parylene) coating. Such a resistor layer can be electrically connected to two adjacent bipolar plates. Such a structure can be useful for micro-fuel cell systems as used in consumer electronics.

Figure 4:
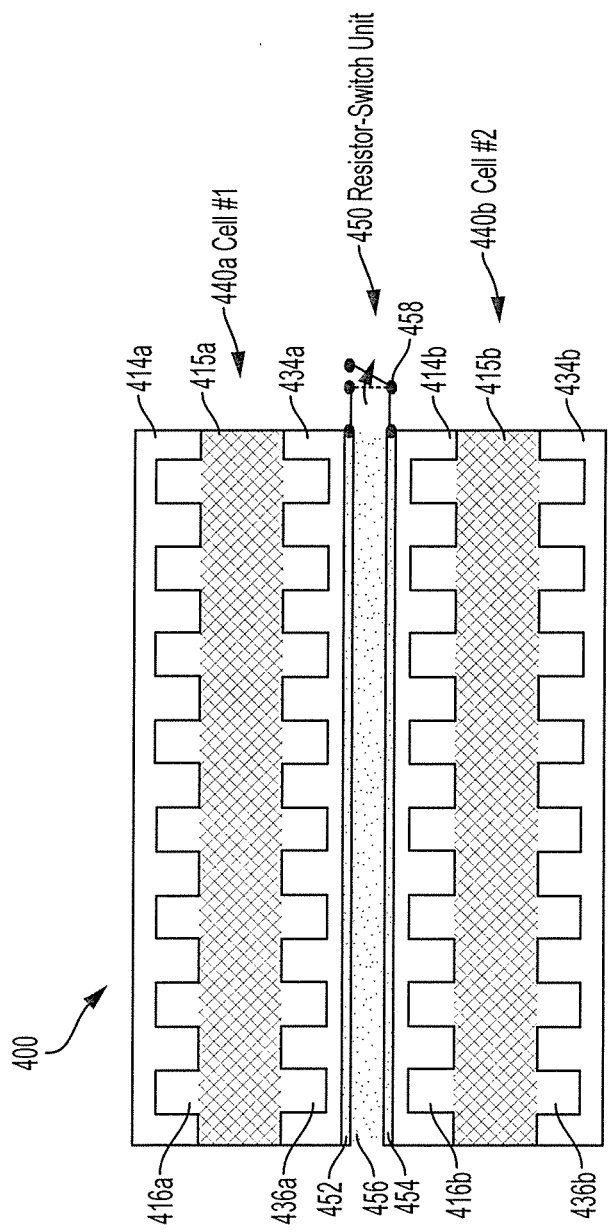
FIG. 4 illustrates the structure of another self-heating fuel cell system with a resistor-switch unit interposed between two fuel cells in a fuel cell stack, according to an embodiment of the present disclosure.
Figure 5:
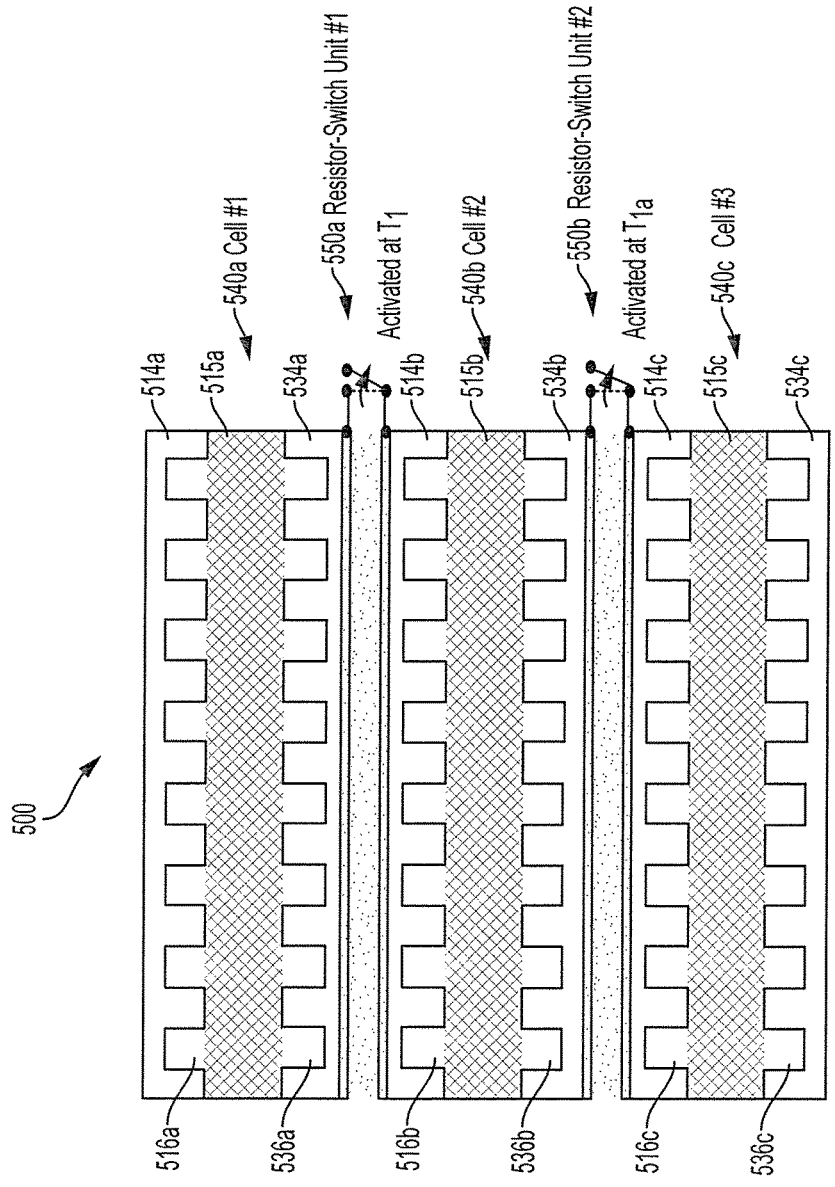
FIG. 5 illustrates the structure of another self-heating fuel cell system with multiple RSUs inserted between various fuel cells in a fuel cell stack according to an embodiment of the present disclosure.
Figure 6:
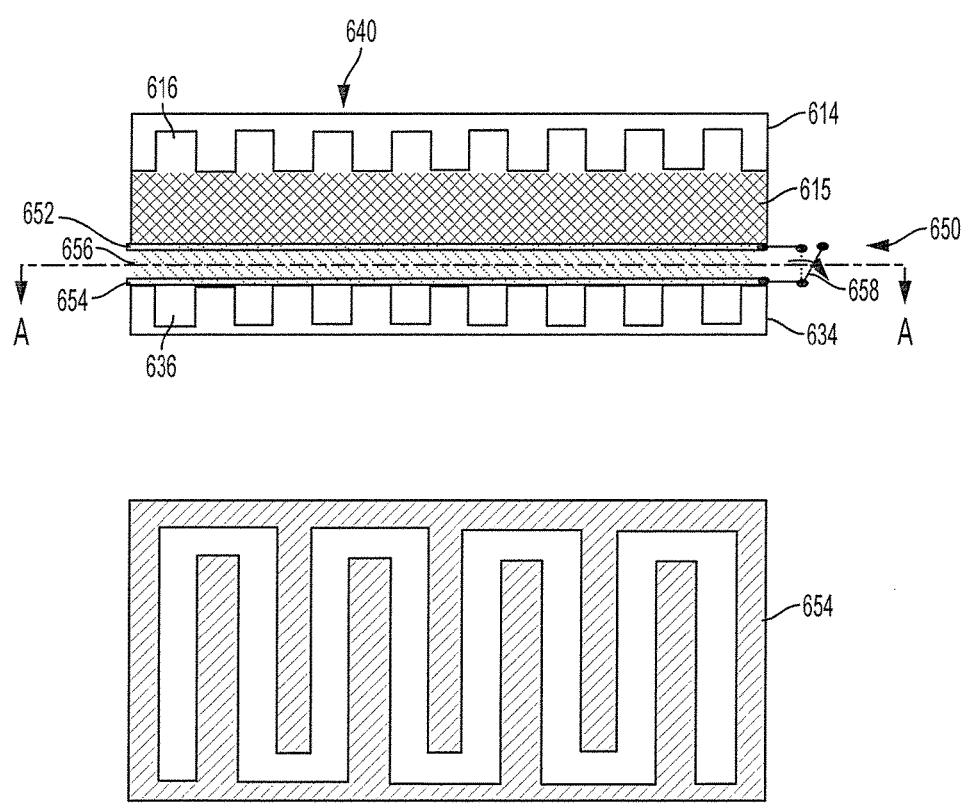
FIG. 6 shows a self-heating fuel cell system with an RSU inserted between the diffusion media and a bipolar plate according to an embodiment of the present disclosure. The RSU is cut into the same rib pattern as the bipolar plate.

Additional embodiments of self-heating fuel cell system of the disclosure are illustrated in FIGS. 4, 5 and 6. These embodiments illustrate a resistor-switch unit (RSU) inserted between two cells in a stack (FIG. 4), multiple RSUs interposed between cells in a stack (FIG. 5), or a RSU inserted between a bipolar plate and a diffusion medium (FIG. 6). In the latter case (FIG. 6), the RSU is cut into a shape matching the rib pattern on the bipolar plate.

For example, FIG. 4 shows RSU 450 between two fuel cells (440a, 440b). The fuel cells include membrane electrode assemblies (MEA) with diffusion media (415a and 415b, respectively) sandwiched between two bipolar plates (414a, 434a and 414b, 434b) having channels to supply fuel to an anode (416a, 416b) and an oxidant to a cathode (436a, 436b).

In this embodiment, RSU 450 is electrically connected to the fuel cells in the system through the bottom bipolar plate 434a of fuel cell 440a and the top bipolar plate 414b of fuel cell 440b. The RSU is in direct contact with both bipolar plates 434a and 414b. RSU 450 includes upper sheet of conductive metal 452 electrically connected and in direct contact with bipolar plate 434a, lower sheet of conductive metal 454 electrically connected and in direct contact with bipolar plate 414b and thin-film resistor 456 interposed between upper sheet 452 and lower sheet 454 and thermal switch 458 that can electrically connect upper sheet 452 with lower sheet 454.

RSU 450 can be operated in the same manner as described with reference to FIG. 3. For example, when switch 458 is closed (Low Resistance State), such as whenever the fuel cell temperature is above a threshold value ($T_1$), current predominately, if not entirely, flows from the fuel cell through the sheets of conductive metal (452 and 454) effectively bypassing thin film resistor 456 and thereby not adding extra internal electrical resistance to the cell. However, when the cell temperature drops below the threshold value $T_1$, the switch is opened (High Resistance State) which forces current generated from the fuel cells to flow through the thin-film resistor and thereby increasing the total cell resistance of the system by $\Delta R$ and lowering the output voltage to a lower level. Joule heat generated on the resistor in turn accelerates warm-up of the fuel cell to above $T_1$. Once the cell temperature rises above $T_1$, the switch can be operated in the closed state (Low Resistance State), and the internal resistance recovers to a low value characteristic of a conventional fuel cell without the RSU and the terminal voltage jumps to a normal operation level under a certain current.

FIG. 5 shows another embodiment of a fuel cell system of the present disclosure. As shown, two RSUs (550a, 550b) are located between fuel cells (540a, 540b and 540b, 540c). The fuel cells include membrane electrode assemblies (MEA) with diffusion media (515a, 515b and 515c, respectively) sandwiched between bipolar plates (534a, 514b, and 534b, 514c, respectively). The bipolar plates have channels to supply fuel to an anode (516a, 516b, 516c) and an oxidant to a cathode (536a, 536b, 536c).

In this embodiment, RSU 550a is electrically connected to the fuel cells in the system through the bottom bipolar plate 534a of fuel cell 540a and the top bipolar plate 514b of fuel cell 540b. RSU 550b is electrically connected to the fuel cells in the system through the bottom bipolar plate 534b of fuel cell 540b and the top bipolar plate 514c of fuel cell 540c. The RSUs are in direct contact with bipolar plates of adjacent fuel cells. Each of the RSUs include an upper sheet of conductive metal electrically connected and in direct contact with a bipolar plate, a lower sheet of conductive metal electrically connected and in direct contact with a bipolar plate and a thin-film resistor interposed between the upper sheet and lower sheet and a switch that can electrically connect the upper sheet with the lower sheet.

The RSUs of this embodiment can be operated in the same manner as described with reference to FIG. 4. For example, when the switch is closed (Low Resistance State), such as whenever the fuel cell temperature is above a threshold value ($T_1$), current predominately, if not entirely, flows from the fuel cell through the sheets of conductive metal effectively bypassing thin film resistor. However, when the cell temperature drops below the threshold value $T_1$, the switch is opened (High Resistance State) which forces current generated from the fuel cells to flow through the thin-film resistor and thereby increasing the total cell resistance of the system by $\Delta R$ and lowering the output voltage to a lower level. Joule heat generated on the resistor in turn accelerates warm-up of the fuel cell to above $T_1$. Once the cell temperature rises above $T_1$, the switch can be operated in the closed state (Low Resistance State), and the internal resistance recovers to a low value characteristic of a conventional fuel cell without the RSU and the terminal voltage jumps to a normal operation level under a certain current.

FIG. 6 shows an embodiment of the present disclosure where a RSU is inserted between a bipolar plate and a diffusion medium. As shown in the figure, fuel cell 640 includes a membrane electrode assembly (MEA) with diffusion media (615). The MEA with diffusion media includes a anode catalyst layer on diffusion medium, proton exchange membrane, and a cathode catalyst layer on diffusion medium, which are not shown for illustrative convenience. The MEA is sandwiched between two bipolar plates (614, 634) having channels to supply fuel to the anode and an oxidant to the cathode (616 and 636, respectively).

In this embodiment, RSU 650 is inserted between bipolar plate 634 and a diffusion medium of fuel cell 640. The diffusion medium can be that associated with the cathode or anode. RSU 650 includes upper sheet of conductive metal 652 electrically connected and in direct contact with the diffusion medium, lower sheet of conductive metal 654, thin-film resistor 656 interposed between upper sheet 652 and lower sheet 654 and thermal switch 658 that can electrically connect upper sheet 652 with lower sheet 654. As shown in the A-A view, lower sheet 654 has a serpentine pattern which is to match the serpentine pattern of bipolar plate 634.

For example, when switch 658 is closed (Low Resistance State), such as whenever the fuel cell temperature is above a threshold value ($T_1$), current predominately, if not entirely, flows from the fuel cell through the sheets of conductive metal (652 and 654) effectively bypassing thin film resistor 656. However, when the cell temperature drops below the threshold value $T_1$, the switch is opened (High Resistance State) which forces current generated from the fuel cell to flow through the thin-film resistor and thereby increasing the total cell resistance of the system by $\Delta R$ and lowering the output voltage to a lower level. Joule heat generated on the resistor in turn accelerates warm-up of the fuel cell to above $T_1$. Once the cell temperature rises above $T_1$, the switch can be operated in the closed state (Low Resistance State), and the internal resistance recovers to a low value characteristic of a conventional fuel cell without the RSU and the terminal voltage jumps to a normal operation level under a certain current.

Figure 7:
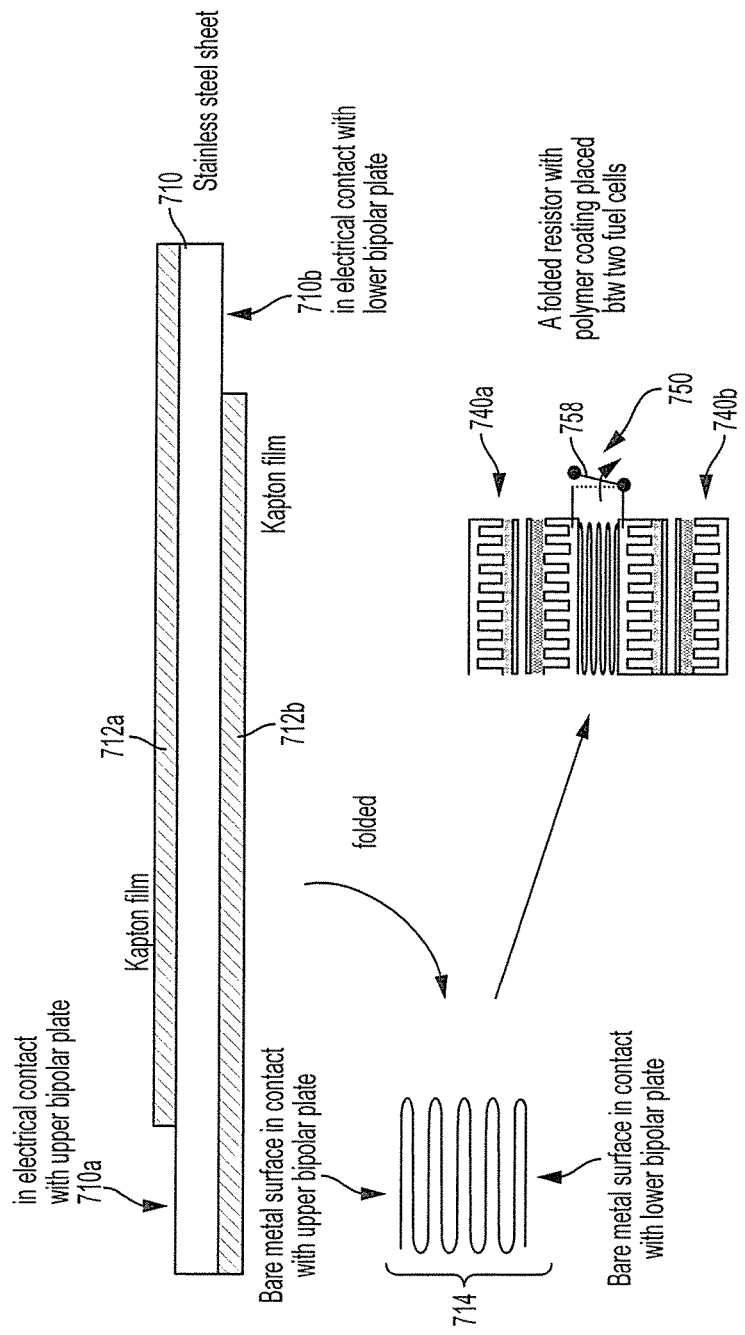
FIG. 7 shows an embodiment of a thin-film resistor made from a thin metal sheet covered on both major surfaces with insulating films such as Kapton, and folded into a multi-layer compact structure.

In another aspect of the present disclosure, the resistor in a RSU can be made from a thin metal sheet such as 25 um stainless steel sheet and covered by an insulating film, e.g., a 7.5 um Kapton film on both major surfaces. Such a resistor can be folded into a compact multi-layer structure and used in an RSU. FIG. 7 illustrates such an RSU. As shown in the figure, thin metal sheet 710 is coated with an insulating layer 712 on both major surfaces thereof 712a and 712b. Thin metal sheet 710 has exposed areas (e.g., areas without the insulating film) for forming electrical contacts (710a and 710b). Thin metal sheet 710 can be folded into compact multi-layer structure 714. The multilayer structure can be inserted between adjacent fuel cells (740a, 740b) such that exposed area 710a is in electrical connection with a bottom bipolar plate of one cell and exposed 710b is in electrical contact with a top bipolar plate of an adjacent cell. Switch 758 can electrically connect the bipolar plates in electrical contact with the multi-layer structure 714 to bypass the multilayer structure (closed state) or to force current through the multi-layer structure (open state).

The uncoated metal surfaces at the top and bottom of the folded structure are electrically connected to two bipolar plates which acts similar to the conductive sheets depicted in FIG. 3. The configuration of the two bipolar plates, folded resistor and switch shown in FIG. 7 operates as the RSU described in FIG. 3.

If the presence of the resistor is designed to lower the fuel cell output voltage from normally around 0.6V/cell to around 0.1V/cell, the resistance of the resistor can be roughly estimated to be 0.5V/I, where I is the current generated from the fuel cell. For example, if a fuel cell generates 200 amps, the resistance of the resistor should be designed as 2.5 mΩ/cell.

Another aspect of the present disclosure is a multi-step change in the internal electrical resistance of a self-heating fuel cell system at multiple threshold temperatures below $T_1$. Such a profile can provide appropriate power adjustments when the system is below normal operating temperatures. For example and as illustrated in FIG. 5, switch #2 (550b) can be set to close (Low Resistance State) at a threshold temperature ($T_{1a}$), say −15° C., while keeping other switches still open (High Resistance State). This will provide some power boost from −15° C. and upwards. Subsequently, switch #1 (550a) can be set to close (Low Resistance State) at $T_1$, e.g., −5° C., giving another power boost. One can design and execute a control algorithm to turn on various switches according to fuel cell temperatures such that power output can be appropriately modulated.

Figure 8:
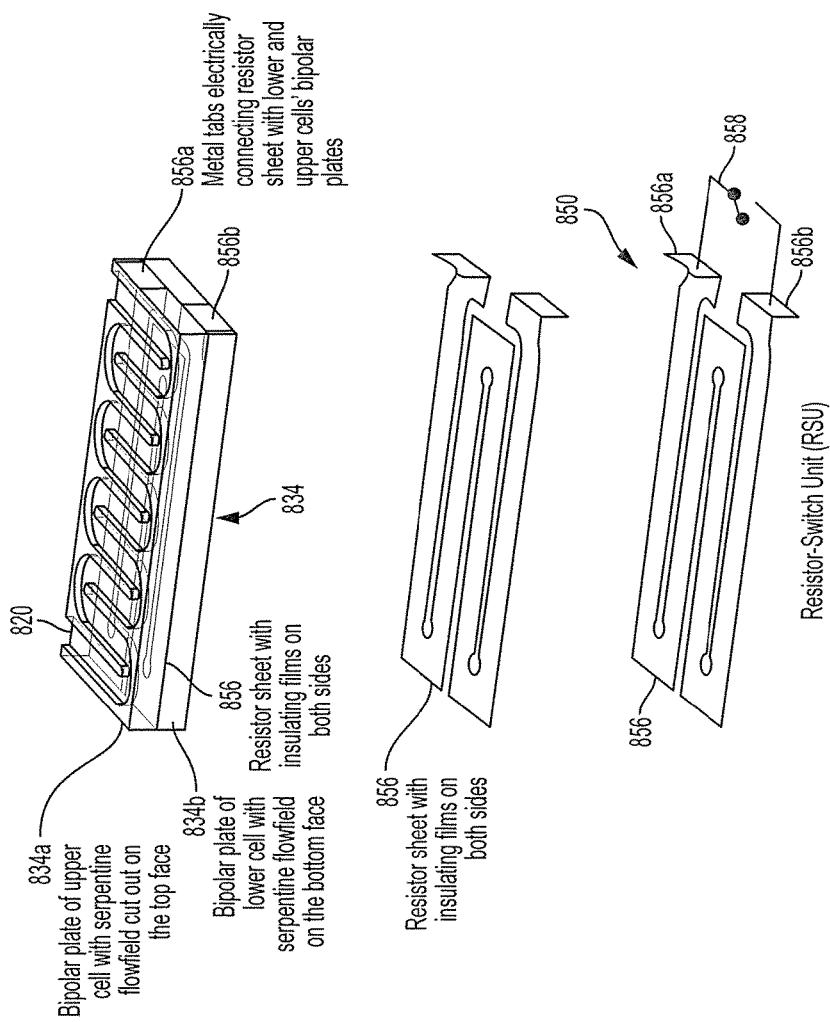
FIG. 8 shows one embodiment of a patterned resistor in the form of a sheet and covered on both major faces by electrically insulating films. The resistor is sandwiched between bipolar plates of a lower and an upper fuel cell according to an embodiment of the present disclosure. The two ends of the resistor are electrically connected to the lower and upper bipolar plates, respectively, along with a switch.

FIG. 8 shows another embodiment of the present disclosure. Here, the bipolar plate between an upper and a lower fuel cell is separated into two parts with a RSU in between. For example, the figure shows bipolar plate 834 with a serpentine flowfield 820 and resistor sheet 856 having insulating films on both major surfaces thereof embedded in plate 834. Bipolar plate 834 would be between two fuel cells, e.g., upper part of bipolar plate 834a would contact an upper fuel cell and lower part of bipolar plate 834b would contact a lower fuel cell, which are not shown for illustrative convenience.

In this embodiment, resistor 856 in the RSU is a patterned electrically conductive thin sheet with two tabs at the two ends (856a, 856b). The tabs electrically connect resistor sheet to the upper and lower portion of the bipolar plate. Tab 856a electrically connects resistor sheet 856 to upper portion of bipolar plate (834a) which is electrically connected to an upper fuel cell and tab 856b electrically connects resistor sheet 856 to lower portion of bipolar plate (834b) which is electrically connected to a lower fuel cell. Both major faces of the sheet are covered or coated by electrically insulating films. Examples of insulating materials include: polyethylene, polypropylene, chlorinated polypropylene, polyester, polyimide, PVDF, PTFE, nylon, or co-polymers of them. The two tabs of the sheet are electrically connected to the lower and upper parts of the bipolar plate, respectively. Additionally, switch 858, which can be controlled by a temperature controller, is electrically connected to the two tabs (856a, 856b) of resistor sheet 856. When the cell temperature is below the threshold point $T_1$, the switch is made OPEN, thus adding an extra resistance from the resistor sheet to the fuel cell. Once the cell temperature rises beyond $T_1$, the switch is CLOSED, making the current bypass the resistor sheet and hence resuming the fuel cell internal resistance to a low level.

Figure 9:
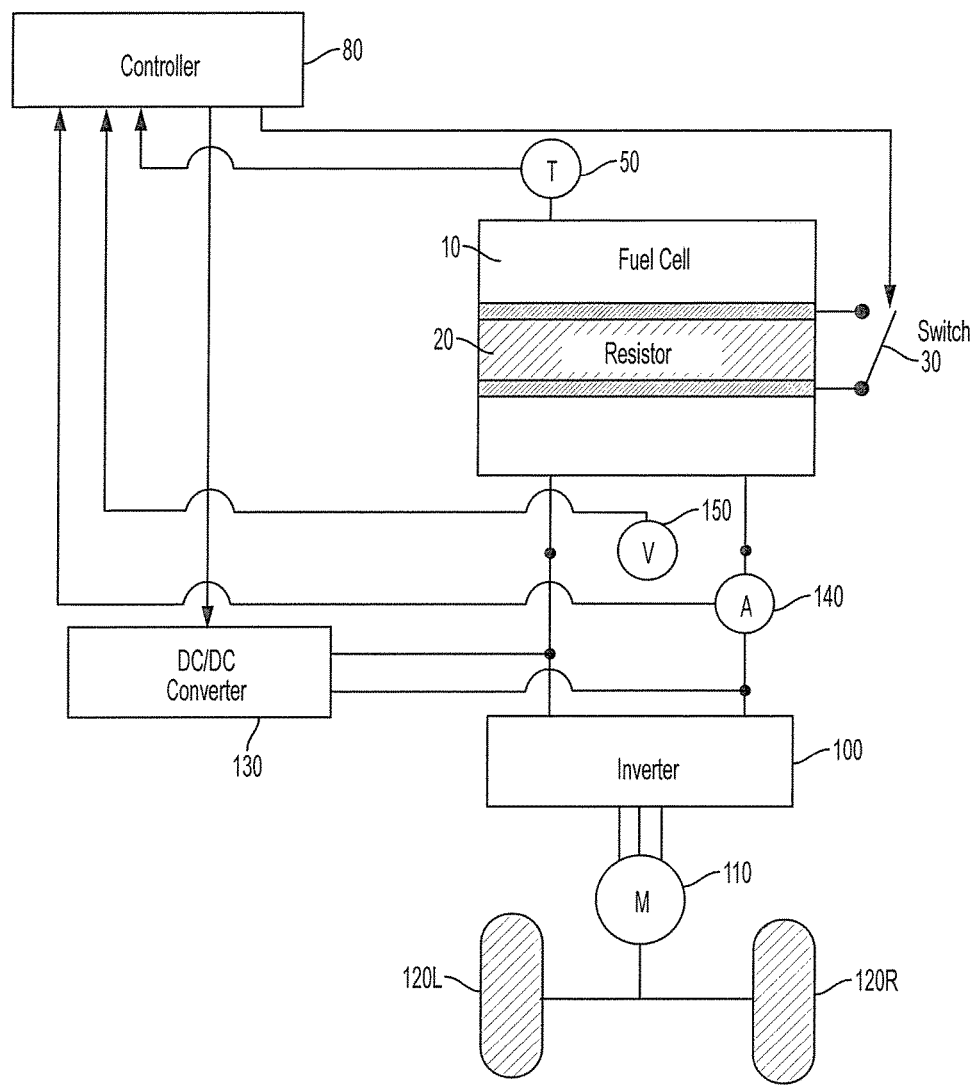
FIG. 9 is a diagram showing a fuel cell system according to an embodiment of the present disclosure electrically connected to a vehicle.

FIG. 9 illustrates a self-heating fuel cell system of the present disclosure configured to operate a motor vehicle. As shown in the figure, the fuel cell system of this embodiment includes fuel cell 10 having resistor 20 electrically connected and in direct contact thereto and switch 30. When switch 30 is open as shown in the figure, current flows through resistor 20 generating heat which heats fuel cell 10.

The system further includes DC/DC converter 130 electrically connected to fuel cell 10 and inverter 100, electric motor 110 electrically connected to inverter 100 and controller 80 electrically connected to switch and configured to open the switch to generated heat in the resistor to heat the fuel cell. Electric motor 110 can be mechanically connected to a drive train to drive wheels 120L and 120R of the vehicle.

The system can also include voltage sensor 150, current sensor 140 and temperature sensor 50 which are all electrically connected to fuel cell 10 and electrically connected to controller 80 and which can all provide inputs to controller 80.

In operation and on receiving a starting command of the system, controller 80 detects a surface temperature of the fuel cell 10 using temperature sensor 50 or an equivalent device. The controller 80 determines that warm-up operation is needed in cases where the surface temperature of fuel cell 10 is below a preset threshold temperature, and shifts switch 30 off. The resistor 20 is operated in the circuit and the fuel cell system is operated at the high resistance mode, lowering the terminal voltage. The controller simultaneously requests DC/DC converter 130 to convert low terminal voltage 150 and certain current 140 into a sufficiently high-voltage power for inverter 100. The inverter then drives electrical motor 110 which is connected to wheels 120. When the temperature of fuel cell 10 reaches the threshold temperature, controller commands switch 30 to on to bypass resistor 20.

The present disclosure is especially effective for fuel cells with untrathin catalyst layers, such as 1 micrometer and less, in which water management at low temperatures is known to be very difficult. The present disclosure also applies to other types of fuel cells and their systems, such as alkaline membrane fuel cells, intermediate temperature fuel cells such as phosphoric acid fuel cells, and solid oxide fuel cells, for rapid startup.

EXAMPLE

The following examples are intended to further illustrate certain preferred embodiments of the present disclosure and are not limiting in nature. Those skilled in the art will recognize, or be able to ascertain, using no more than routine experimentation, numerous equivalents to the specific substances and procedures described herein.

A PEM fuel cell of 25 $cm^2$ was assembled using stamped-metal bipolar plates for both anode and cathode sides. A serpentine flow field of dimensions 0.6 mm width and 0.35 mm height with the rib width of 0.6 mm was used. The MEA used in this cell included 18 um fluorinated composite membrane and catalyst layers with 0.32 mg/$cm^2$ Pt-loading on each side. Teflon-coated Toray-030 carbon paper coated with 30 um microporous layer (MPL) was used as the gas diffusion media. The resistor in the form of a sheet was attached to the cathode plate and sized to have a resistance of 0.2 Ohm or 0.5 Ohm-$cm^2$. The thermal mass of the entire cell was estimated to be 0.1 J/($cm^2$K). The cell was sandwiched between two Lexan plates to provide adiabatic conditions.

Figure 10:
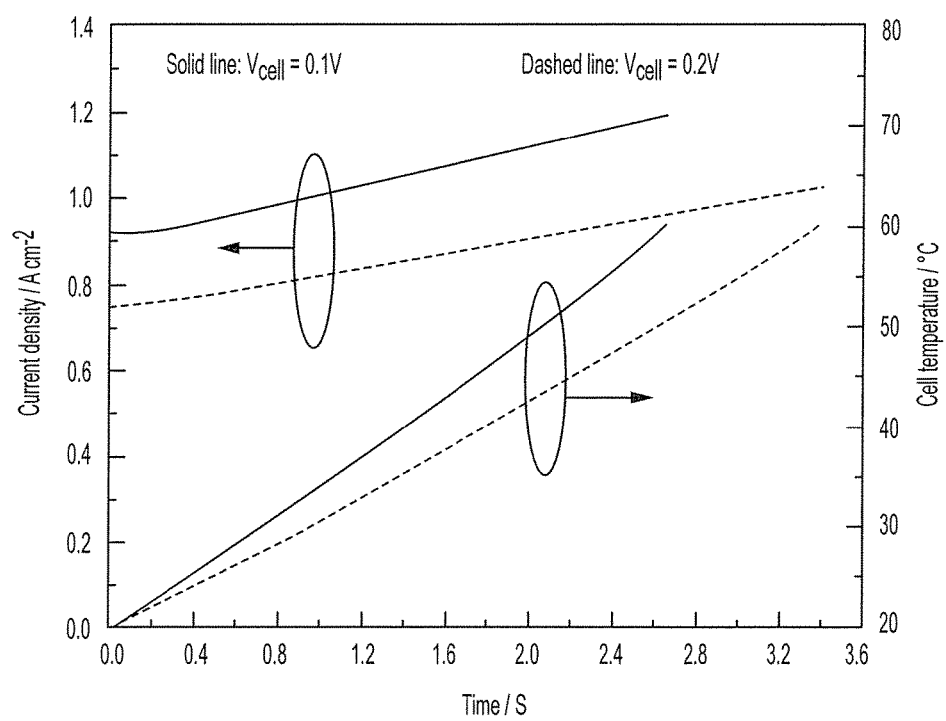
FIG. 10 is a chart showing current density and temperature responses during the start of a fuel cell system from room temperature according to an embodiment of the present disclosure.

The first set of tests was run to self-start the fuel cell from room temperature, i.e. 20° C., and at pressure of 2 atm (absolute) on both fuel and air sides. The hydrogen and air flows were at 0 and 60% relative humidity corresponding to the ambient temperature with flow stoichiometries of 1.5 and 2 at 1 A/$cm^2$, respectively. The resulting current and temperature versus time are shown in FIG. 10 for two cases, one with the cell voltage kept constant at 0.1V and the other at 0.2V. It is seen that the cell warms up from room temperature to an optimal operating temperature of 60° C. in just 2.7 seconds in the case of 0.1V and 3.4 seconds at 0.2V, respectively. In the meanwhile, the current density increases from ~0.9 at t=0 to 1.2 A/cm$^2$ when the cell temperature reaches 60° C. for the 0.1V case, and from 0.75 to 1.02 A/cm$^2$ in the 0.2V case. These tests clearly demonstrate that a fuel cell system including a fuel cell and the resistor according to present disclosure is able to rapidly warm-up by itself, leaving fuel cell operation in the suboptimal range only lasting for a few seconds under any ambient conditions. Therefore, the self-heating fuel cell systems of the present disclosure can greatly improve water management of the fuel cell at low temperatures compared to conventional fuel cell systems. It is even possible to completely eliminate any humidification systems for a PEM fuel cell system, as shown in the above-described experiments.

Only the preferred embodiment of the present disclosure and examples of its versatility are shown and described in the present disclosure. It is to be understood that the present disclosure is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this disclosure, and are covered by the following claims.

What is claimed is:

1. A self-heating fuel cell system comprising at least one fuel cell and at least one resistor-switch unit electrically connected to the at least one fuel cell, wherein the at least one resistor-switch unit comprises a resistor and a switch and wherein the switch is electrically connected in parallel with the resistor and wherein the resistor is in thermal contact with the at least one fuel cell.

2. The system according to claim 1, comprising a first internal resistance ($R_1$) of the system when the temperature of the at least one fuel cell is greater than a temperature ($T_1$) and a second internal resistance ($R_2$) of the system when the temperature of the at least one fuel cell is below $T_1$, wherein the value of $R_2$ at about 2° C. below $T_1$ is at least twice the value of $R_1$ at $T_1$.

3. The system according to claim 2, wherein $T_1$ is less than 95° C.

4. The system according to claim 1, wherein the fuel cell comprises a bipolar plate with a flowfield for fuel flow on an anode, a diffusion media on a membrane-electrode assembly, a bipolar plate with a flowfield for oxidant flow on a cathode, wherein the resistor is placed in direct contact with one of the bipolar plates.

5. The system according to claim 4, wherein the resistor is inside the at least one fuel cell, or outside of the at least one fuel cell.

6. The system according to claim 1, comprising a stack of fuel cells and wherein the at least one fuel cell is among the stack of fuel cells and the resistor is in contact with the at least one fuel cell and an adjacent fuel cell in the stack of fuel cells.

7. The system according to claim 6, comprising multiple resistor-switch units wherein the multiple resistors of the multiple resistor-switch units contact adjacent fuel cells over several locations in the fuel cell stack.

8. The system according to claim 4, wherein the resistor is between the diffusion media and one of the bipolar plates of the at least one fuel cell.

9. The system according to claim 1, wherein the resistor comprises an electrically conductive sheet made of graphite, stainless steel, nickel, chrome, nichrome, copper, aluminum, titanium, or alloys thereof.

10. The system according to claim 9, wherein the resistor is a thin metal sheet having one or more electrically insulating films on one or both major surfaces of the sheet.

11. The system according to claim 10, wherein the resistor has an overall thickness between 1 and 100 micrometers.

12. The system according to claim 10, wherein the electrically insulating films comprise polyethylene, polypropylene, chlorinated polypropylene, polyester, polyimide, PVDF, PTFE, nylon, or co-polymers thereof.

13. The system according to claim 1, further comprising a controller configured to operate the switch to an open state or a closed state based upon an input from a temperature sensing device that can measure a surface temperature of the at least one fuel cell.

14. The system according to claim 7, wherein the multiple switches can be activated sequentially according to a control algorithm.

15. The system according to claim 1, wherein the at least one fuel cell is a proton exchange membrane fuel cell that can operate on hydrogen or hydrogen-containing gases.

16. The system according to claim 1, further comprising a DC/DC converter electrically connected to the fuel cell, an inverter electrically connected to the DC/DC converter, an electric motor electrically connected to the inverter and a controller electrically connected to the switch and configured open the switch to generated heat in the resistor to heat the fuel cell.

17. A method of operating a self-heating fuel cell system, the method comprising operating the system of claim 1 at a first internal resistance ($R_1$) when the temperature of at least one fuel cell in the system is greater than a temperature ($T_1$), and operating the system at a second internal resistance ($R_2$) of the system when the temperature of the at least one fuel cell is below $T_1$, by activating the switch that activates either $R_1$ or $R_2$ depending on $T_1$.

18. The method according to claim 17, wherein $T_1$ is less than 95° C.

19. A self-heating fuel cell system comprising:
at least one fuel cell and at least one resistor-switch unit electrically connected to the at least one fuel cell,
wherein the fuel cell comprises a bipolar plate with a flowfield for fuel flow on an anode, a diffusion media on a membrane-electrode assembly, a bipolar plate with a flowfield for oxidant flow on a cathode, and
wherein the at least one resistor-switch unit comprises a resistor and a switch, the switch is electrically connected in parallel with the resistor and the resistor is in thermal contact with one of the bipolar plates.

20. The system according to claim 19, wherein the resistor comprises an electrically conductive sheet.

* * * * *